United States Patent
Ionel et al.

(10) Patent No.: US 7,638,913 B2
(45) Date of Patent: Dec. 29, 2009

(54) ROTOR CORE WITH SPACERS (75) Inventors: Dan M. Ionel, Fox Point, WI (US); Stephen J. Dellinger, Houston, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 582 days.

(21) Appl. No.: 11/420,256

(22) Filed: May 25, 2006

(65) Prior Publication Data

US 2006/0267442 A1 Nov. 30, 2006

Related U.S. Application Data

(60) Provisional application No. 60/685,256, filed on May 27, 2005.

(51) Int. Cl.
*H02K 7/20* (2006.01)
(52) U.S. Cl. .................. 310/112; 310/114; 310/156.12
(58) Field of Classification Search .................. 310/112, 310/113, 114, 156.12–156.15
See application file for complete search history.

(56) References Cited

U.S. PATENT DOCUMENTS

| | | | |
|---|---|---|---|
| 3,845,340 A | 10/1974 | Brooks et al. | |
| 3,855,486 A | 12/1974 | Binder et al. | |
| 4,053,801 A | 10/1977 | Ray et al. | |
| 4,134,054 A * | 1/1979 | Akamatsu | 318/685 |
| 4,433,260 A | 2/1984 | Weisbord et al. | |
| 4,471,248 A * | 9/1984 | Smetana | 310/51 |
| 4,514,654 A | 4/1985 | Muller | |
| 4,542,313 A | 9/1985 | De Pietro | |
| 4,712,027 A | 12/1987 | Karidis | |
| 5,091,668 A * | 2/1992 | Cuenot et al. | 310/156.61 |
| 5,463,262 A * | 10/1995 | Uchida | 310/156.61 |
| 5,481,147 A | 1/1996 | Kaplan et al. | |
| 5,485,046 A | 1/1996 | Kaplan et al. | |
| 5,504,382 A * | 4/1996 | Douglass et al. | 310/156.25 |
| 5,877,574 A | 3/1999 | Molnar | |
| 6,020,660 A | 2/2000 | Wright | |
| 6,153,951 A | 11/2000 | Morita et al. | |
| 6,157,109 A * | 12/2000 | Schiferl et al. | 310/216.019 |
| 6,166,469 A * | 12/2000 | Osama et al. | 310/90.5 |
| 6,265,802 B1 | 7/2001 | Getschmann | |
| 6,794,781 B2 | 9/2004 | Razzell et al. | |
| 6,891,308 B2 * | 5/2005 | Shoykhet | 310/260 |
| 6,920,683 B2 | 7/2005 | Tanaka | |
| 7,005,764 B2 * | 2/2006 | Petersen | 310/44 |
| 2003/0201678 A1 | 10/2003 | Huang et al. | |
| 2005/0034295 A1 | 2/2005 | Meacham et al. | |

* cited by examiner

*Primary Examiner*—Dang D Le
(74) *Attorney, Agent, or Firm*—Michael Best & Friedrich LLP (57) ABSTRACT

An electric machine that includes a stator core having a stator core length, a first rotor core portion, and second rotor core portion. A spacer is coupled to the first core portion and the second core portion to at least partially define a rotor core. The rotor core has a length that is greater than the stator core length. A permanent magnet is coupled to the rotor core and has a magnet length. The magnet length is greater than the stator core length.

27 Claims, 7 Drawing Sheets

ROTOR CORE WITH SPACERS

RELATED APPLICATION DATA

This application claims priority to U.S. Provisional Patent Application Ser. No. 60/689,962 filed on May 27, 2005, the contents of which are fully incorporated herein by reference.

BACKGROUND

The invention relates to a rotor core for electrical machines. More particularly, the invention relates to an electric machine that includes a stator core having a stator core length and a rotor core having a rotor core length that is greater than the stator core length.

Figure 1:
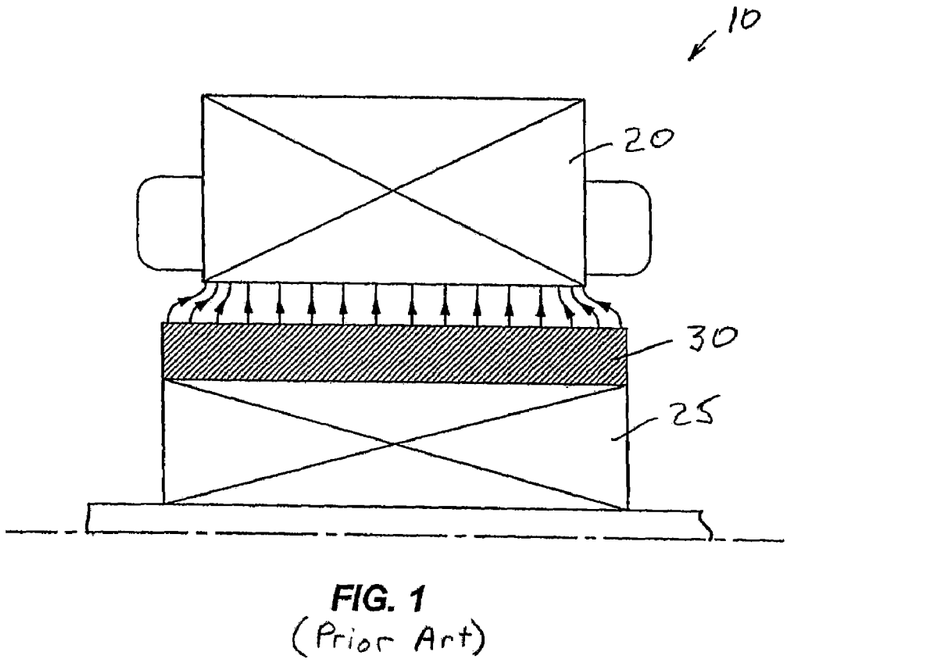
FIG. 1 is a schematic illustration of a longitudinal-sectional view of a prior art motor including a stator and a rotor.
Figure 2:
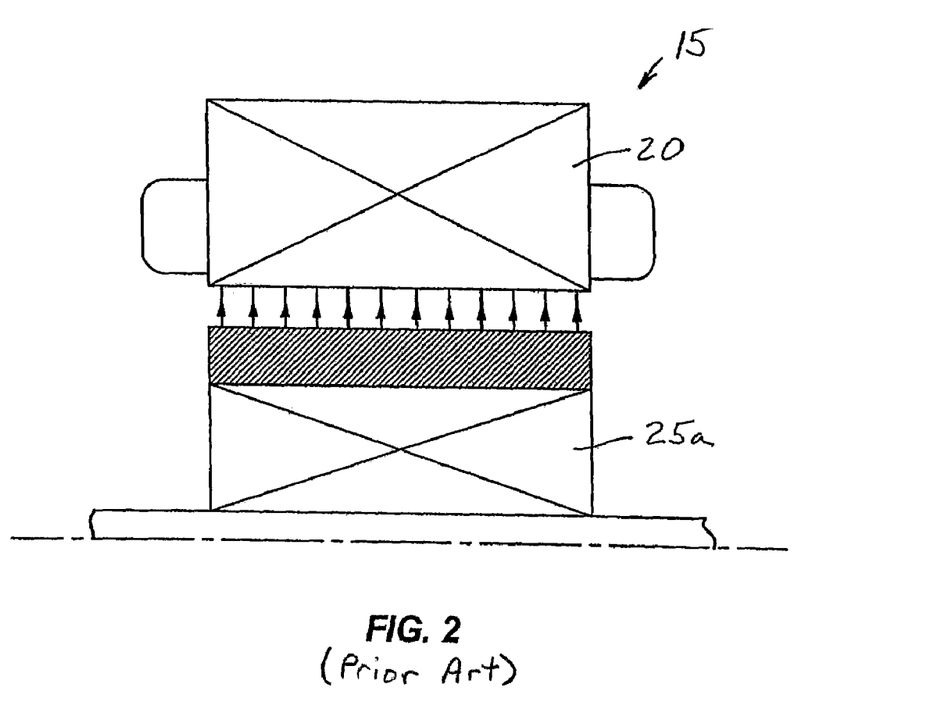
FIG. 2 is a schematic illustration of a longitudinal-sectional view of another prior art motor including a stator and a rotor.

Two prior-art motors 10, 15 are shown in FIGS. 1-2, The motor 10 includes a stator core 20 and a rotor core 25 manufactured using the same number of laminations which are punched with a single tool (die). Specifically, the tool, such as a progressive die, simultaneously punches a stator lamination and a rotor lamination, which is positioned inside the stator lamination in order to reduce waste.

The motor 15 of FIG. 2 includes a stator core 20 and a rotor core 25a that have the same length. This construction is advantageous from the cost point of view, as the same number of laminations is used for both the stator core 20 and the rotor core 25a. The output of the motor 10 of FIG. 1, which uses the same stator core 20 as in FIG. 2, is improved over the output of the motor 15 of FIG. 2 due to the use of a longer rotor core 25 and magnet 30, the flux of which is axially concentrated through the stator. As a result, air-gap flux density, the stator flux linkage, the machine specific output, and/or efficiency are increased. The major drawback of this solution is the increase in cost associated with the need to produce more rotor laminations than stator laminations. The increased number of rotor laminations, as compared to stator laminations of FIG. 2, requires the manufacturer to purchase additional laminated steel and invest in supplementary tooling, which can produce rotor laminations alone, rather than the more common stator and rotor lamination combination.

The invention overcomes this disadvantage through special constructions for which an increased motor output is achieved by using approximately the same number of laminations in the stator core and rotor core.

SUMMARY

In one embodiment, the invention provides an electric machine that includes a stator core having a stator core length, a first rotor core portion, and a second rotor core portion. A spacer is coupled to the first core portion and the second core portion to at least partially define a rotor core that has a rotor core length that is greater than the stator core length. A permanent magnet is coupled to the rotor core and has a magnet length. The magnet length is greater than the stator core length.

In another embodiment, the invention provides an electric machine that includes a rotor shaft, a quantity of stator laminations stacked adjacent one another to define a stator core having a stator core length, and a quantity of rotor laminations coupled to the rotor shaft. The quantity of rotor laminations is about equal to the quantity of stator laminations. A permanent magnet is coupled to at least one of the rotor laminations and has a magnet length that is greater than the stator core length.

The invention also provides a method of manufacturing a motor. The method includes forming a quantity of stator laminations, stacking the quantity of stator laminations to define a stator core having a first end and a second end that define a stator length, and forming a quantity of rotor laminations. The method also includes stacking the quantity of rotor laminations and connecting a spacer to at least one of the rotor laminations such that the quantity of rotor laminations and the spacer cooperate to define a rotor core having a rotor core length. The method further includes attaching a permanent magnet to the rotor core to define a rotor. The permanent magnet has a magnet length that is greater than the stator core length.

Other aspects and embodiments of the invention will become apparent by consideration of the detailed description and accompanying drawings.

BRIEF DESCRIPTION OF THE DRAWINGS

The detailed description particularly refers to the accompanying figures in which:

FIG. 4a is an enlarged schematic illustration of a portion of the motor of FIG. 4, within the contour denoted by 4a;

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

Before proceeding, it should be noted that the invention described herein is especially suitable for brushless motors with circumferentially placed magnets, a typical example being the rotor designs with surface mounted magnets, which are radially magnetized. However, the invention can also be adapted for other type of rotors, such as but not limited to interior permanent magnet rotors or "spoke" rotors in which the magnets are at least partially fitted inside the rotor core.

Figure 3:
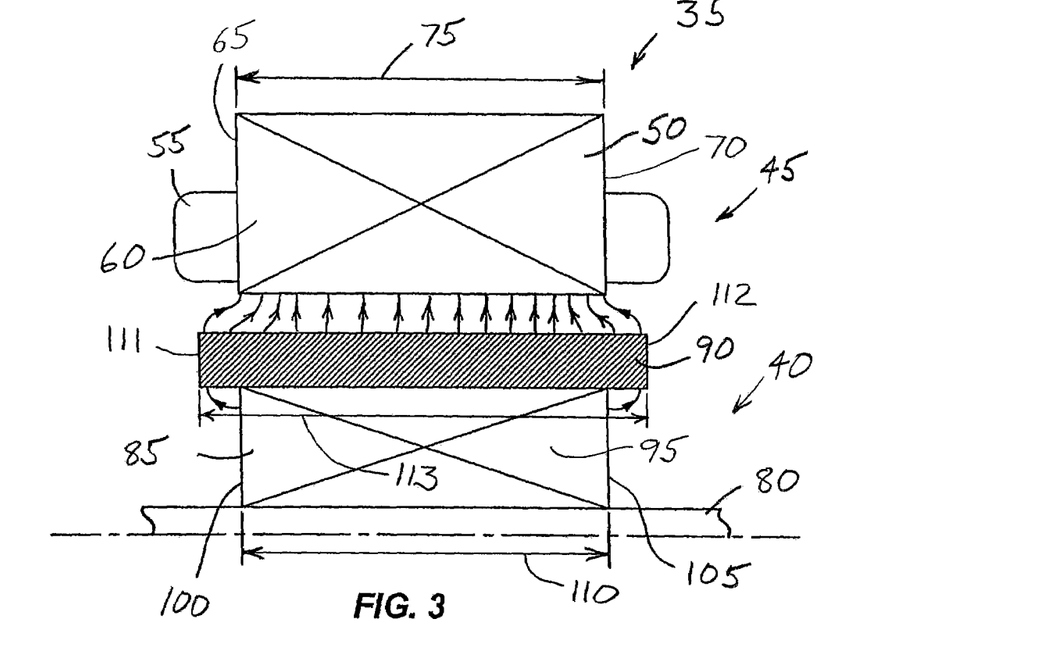
FIG. 3 is a schematic illustration of a longitudinal-sectional view of a motor including a stator and a rotor.

FIG. 3 illustrates a motor 35 that includes a rotor 40 and a stator 45 positioned to define an air gap therebetween. The stator 45 includes a core 50 that is wound with one or more conductors to define coils and windings 55. The core 50 is formed from a stack of laminations 60 that define a first core end 65 and a second core end 70. A stator core length 75 is defined as the length of the core 50 as measured between the first end 65 and the second end 70.

The rotor 40 includes a shaft 80 that supports a rotor core 85. The rotor core 85 in turn supports one or more permanent magnets 90. As with the stator core 50, the rotor core 85 is formed from a plurality of stacked laminations 95. In preferred constructions, the rotor core 85 includes about the same number of laminations 95 as the stator core 50 (e.g., within about 20 percent). The rotor core 85 includes a first end 100 and a second end 105 that cooperate to define a rotor core length 110. In the construction illustrated in FIG. 3, the rotor core length 110 is about equal to the stator core length 75.

As illustrated in FIG. 3, the permanent magnet 90 attaches to the outer periphery of the rotor laminations 95 and includes a first end 111 that extends beyond the first end 100 and a second end 112 that extends beyond the second end 105 of the rotor core 85. Thus, the construction of FIG. 3 includes a magnet 90 that defines a magnet length 113, measured from the first end 111 to the second end 112, that is greater than the length 75 of the stator core 50. However, the rotor core length 110 is substantially the same as the stator core length 75. Thus, the magnet 90 overhangs the rotor core 85 and the benefits in increasing the air-gap flux density at the stator surface and the stator winding flux linkage are minimal, mainly due to the increased reluctance of the end magnetic field path.

Before proceeding, it should be noted that the magnet length 113, as well as the stator core length 75 and the rotor core length 110, are measured from the extreme axial positions of the component. Thus, constructions that employ multiple magnets stacked up along the axial length still define a magnet length that encompasses all of the magnets. Gaps between magnets become part of the magnet length. Similarly, gaps in the stator core 50 or rotor core 85 would add to the stator core length 75 and the rotor core length 110.

Figure 12:
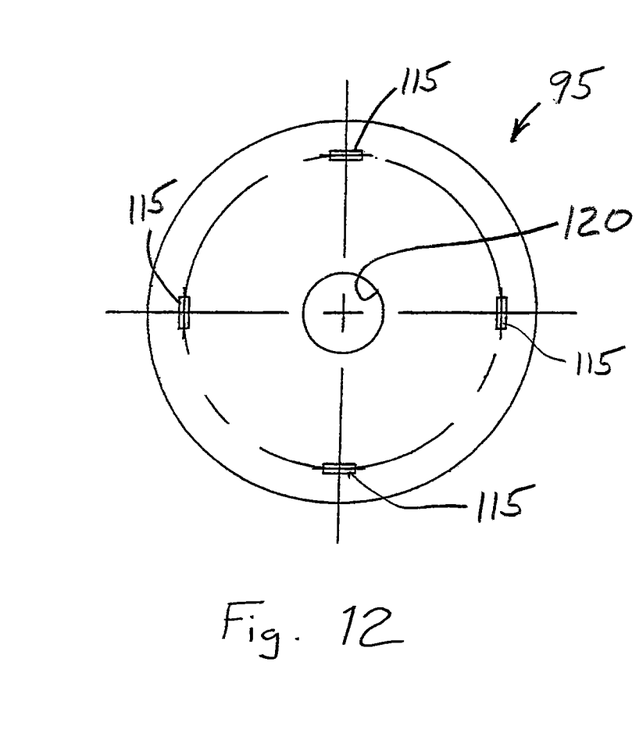
FIG. 12 is a front view of a rotor lamination.
Figure 13:
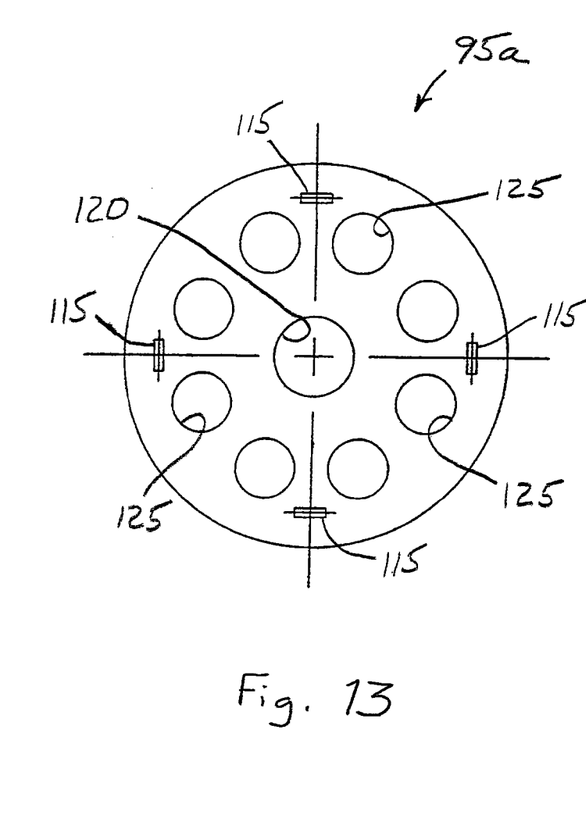
FIG. 13 is a front view of another rotor lamination.

FIGS. 12 and 13 illustrate two possible laminations 95, 95a for use in a rotor core 85. The lamination 95 of FIG. 12 is substantially circular when viewed from the end and includes four alignment members 115 and a central aperture 120 for use in attaching the lamination to the rotor shaft 80. In most constructions, the central aperture 120 is circular and is sized to provide an interference fit between the aperture 120 and the rotor shaft 80. Other constructions may employ other shapes or sizes for the aperture 120 as desired.

The alignment members 115 of FIGS. 12 and 13 include rectangular apertures that are located approximately 90 degrees apart from one another. The apertures aid in aligning adjacent laminations 95 during the stacking process of the rotor core 85. In other constructions, lances, indentations, or other features are used as alignment members 115 in place of the rectangular apertures. In addition, other quantities or shapes could be employed if desired. In some constructions the rotor laminations are welded or bonded together, or other means known to those skilled in the art are employed to form a core stack.

The lamination 95a of FIG. 13 is similar to the lamination 95 of FIG. 12 with the exception of eight additional weight-reducing apertures 125 that extend through the lamination 95a. The weight-reducing apertures 125 reduce the weight of the lamination 95a such that a rotor core 85 constructed using the laminations 95a of FIG. 13 is significantly lighter than a rotor core 85 constructed using the laminations 95 of FIG. 12. Rotor cores 85 can be constructed using either the laminations 95, 95a illustrated in FIG. 12 or FIG. 13, or a combination of these laminations 95, 95a as desired. In addition, other lamination arrangements not discussed herein could be employed if desired.

Figure 4:
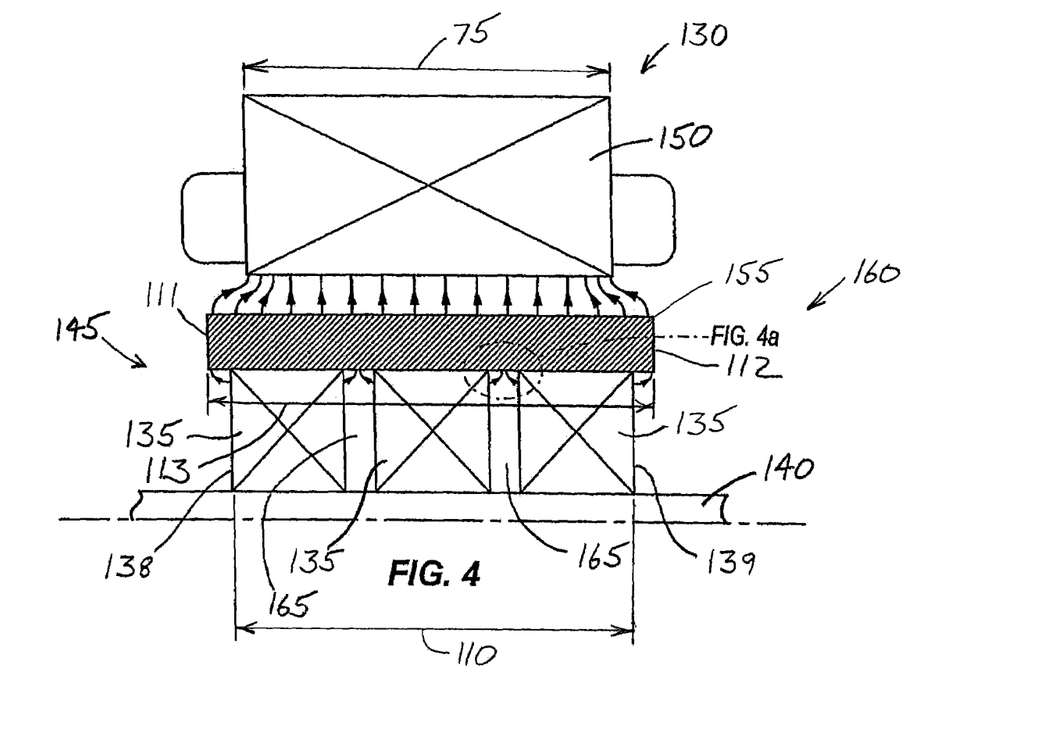
FIG. 4 is a schematic illustration of a longitudinal-sectional view of a motor including a stator and a rotor that includes gaps or spaces.
Figure 4A:
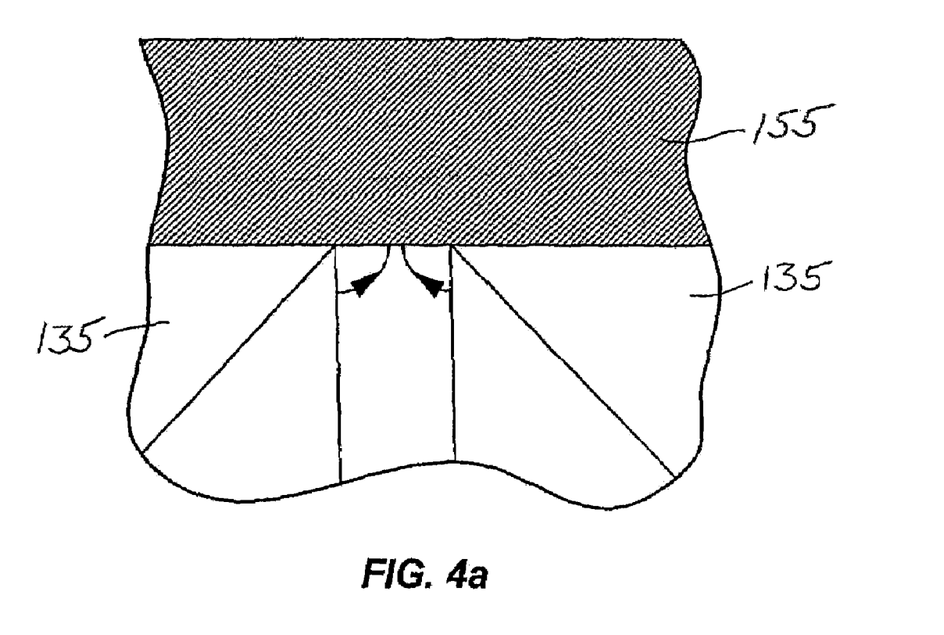

FIG. 4 illustrates a motor 130 that improves upon the operational characteristics of the motor 35 of FIG. 3. The motor 130 includes three axial rotor core modules 135 approximately equally spaced on a shaft 140 to at least partially define a rotor core 145. Each rotor core module 135 is generally assembled from a plurality of laminations 95, 95a similar to those illustrated in FIG. 12 or 13. In one construction, a combination of the two illustrated laminations 95, 95a is used. Most of the laminations 95, 95a are inner laminations 95a such as the lamination 95a illustrated in FIG. 13. Each end of the stack of inner laminations 95a receives at least one end lamination 95 that does not include the weight-reducing holes 125. The use of end laminations 95 reduces the windage losses of the rotor core modules 135, while the weight-reducing holes 125 of the inner laminations 95a reduce the rotor core weight, and thus reduce mechanical losses. In other rotor constructions, only one type of lamination, for example lamination 95a, is employed. In preferred constructions, the total axial length of the rotor core modules 135 are chosen to match the axial length of a stator core 150, thus allowing for the use of substantially the same number of laminations for each of the rotor core 145 and the stator core 150. In some rotor constructions, such as the construction of FIG. 5, the rotor core modules 135 are spaced such that the rotor core end 138 is axially aligned (flushed) with the magnet end 111 and the rotor core end 139 is axially aligned with the magnet end 112, respectively.

As illustrated in FIG. 4, each of the rotor core modules 135 is coupled to the rotor shaft 140 and one or more permanent magnets 155 are attached to the rotor core modules 135 to complete a rotor 160. The three rotor core modules 135 are positioned such that a space or gap 165 is defined between any two adjacent rotor core modules 135. Thus, the rotor core length 110, including the axial length of each of the core modules 135 and the gaps 165, is greater than the stator core length 75, while still employing about the same number of laminations. It should be noted that a direct connection of each rotor core module to the shaft is not an absolute requirement. For example, in some constructions, only one rotor core module is directly connected (i.e., in contact with) to the shaft and the other modules are connected to the module which is connected to the shaft. Thus, in this example only one rotor core module is directly connected to the shaft with the other rotor core module or modules connected to the first rotor core module.

Small rings (not shown) can be placed around the shaft 140 to space the rotor core modules 135 at the desired locations. The rings could be built for example from a non-magnetic material such as plastic. Additionally, in some constructions the rotor core modules 135 are manufactured such that the end laminations flare (bend) towards the exterior, thereby further enhancing the axial path of the magnetic flux. Due to the improved axial distribution of the non-linear magnetic circuit, the air-gap flux density, the stator flux-linkage, and motor output are all increased in comparison with that of the motor 35 of FIG. 3.

Before proceeding, it should be noted that while the construction illustrated in FIG. 4 includes three rotor core modules 135, other constructions may employ two rotor core modules 135 or four or more rotor core modules 135. As such, the invention should not be limited to constructions that employ three rotor core modules 135.

Figure 5:
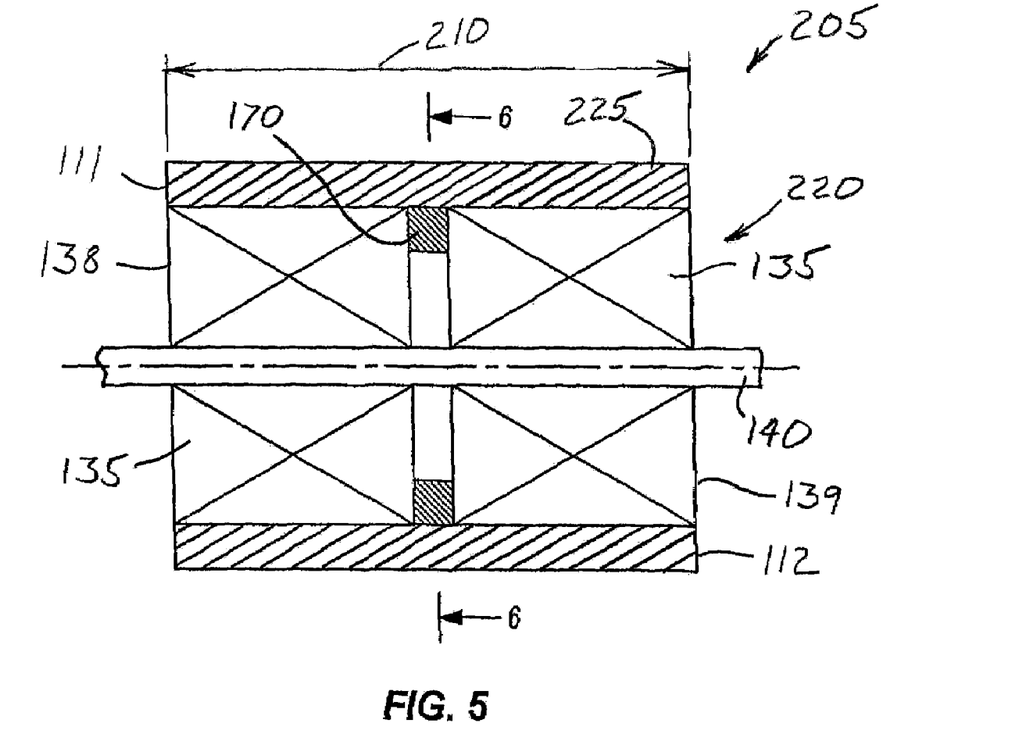
FIG. 5 is a schematic illustration of a longitudinal-sectional view of a rotor that includes a magnetic spacer or extender.
Figure 7:
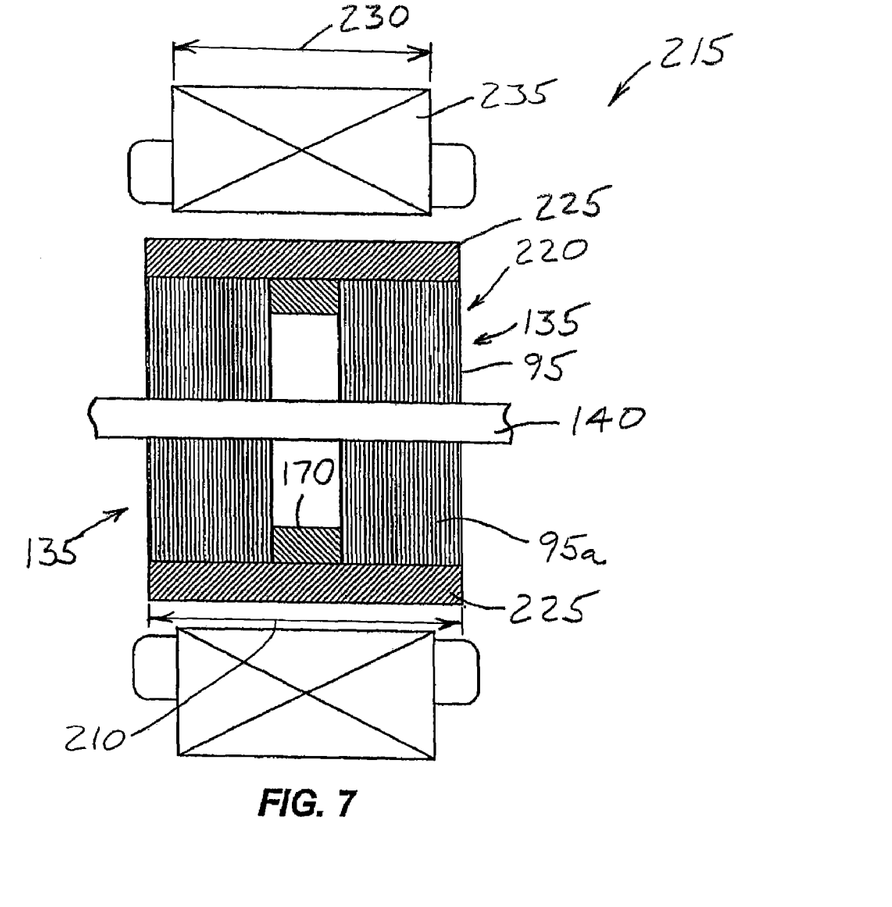
FIG. 7 is a schematic illustration of a longitudinal-sectional view of a motor including a stator and a rotor that includes a magnetic spacer or extender.
Figure 10:
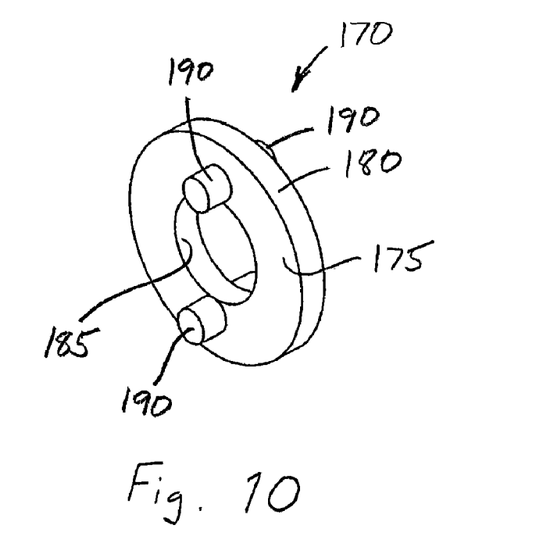
FIG. 10 is a perspective view of a spacer.
Figure 11:
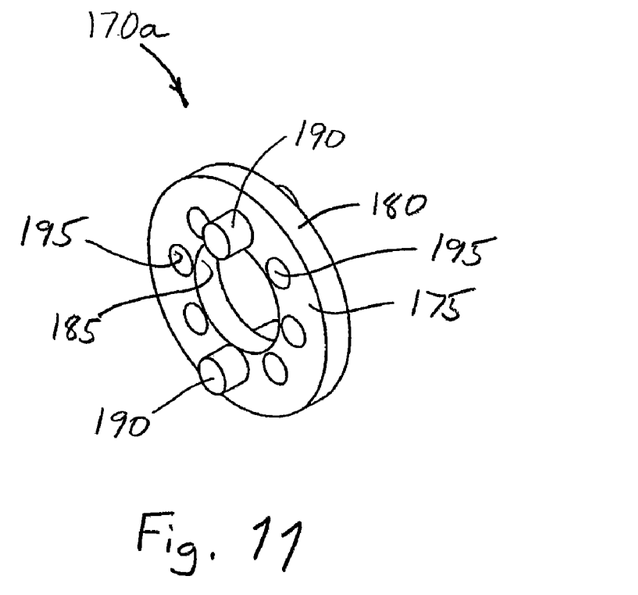
FIG. 11 is a perspective view of another spacer.

To further increase motor performance, a magnetic spacer 170 or extender may be positioned between rotor core modules 135 as shown in FIGS. 5 and 7. FIGS. 10 and 11 illustrate two possible magnetic extenders 170, 170*a* that may be employed in a rotor core 145. In preferred constructions, the magnetic extenders 170, 170*a* include a ferromagnetic isotropic material, with other materials also being suitable for use. The spacer 170 of FIG. 10 includes a substantially ring shaped portion 175 that includes an outer diameter 180 that is substantially equal to the outer diameter of the rotor laminations 95, 95*a*, and an inner diameter 185 selected to maintain the rotor saturation and mmf drop at a desirable level, while also reducing the weight of the spacer 170.

The spacer 170 also includes four projections 190 that extend from the ring shaped portion 175. Two projections 190 extend in each axial direction with the projections 190 extending in the same direction being spaced about 180 degrees apart. Each of the projections 190 is sized to engage one of the weight-reducing apertures 125 of the laminations 95, 95*a* to fix the position of the spacer 170. In other constructions, other arrangements, quantities, sizes, and/or shapes may be employed to define the projections 190.

The spacer 170*a* of FIG. 11 is much like the spacer 170 of FIG. 10 but additionally includes weight-reducing apertures 195, which extend through the ring shaped portion 175 and reduce the weight and inertia of the spacer 170*a* when compared to the spacer 170 of FIG. 10. The shape, dimensions and position of the apertures 195 can be the same or different of that of apertures 125 from the lamination 95*a*.

Figure 6:
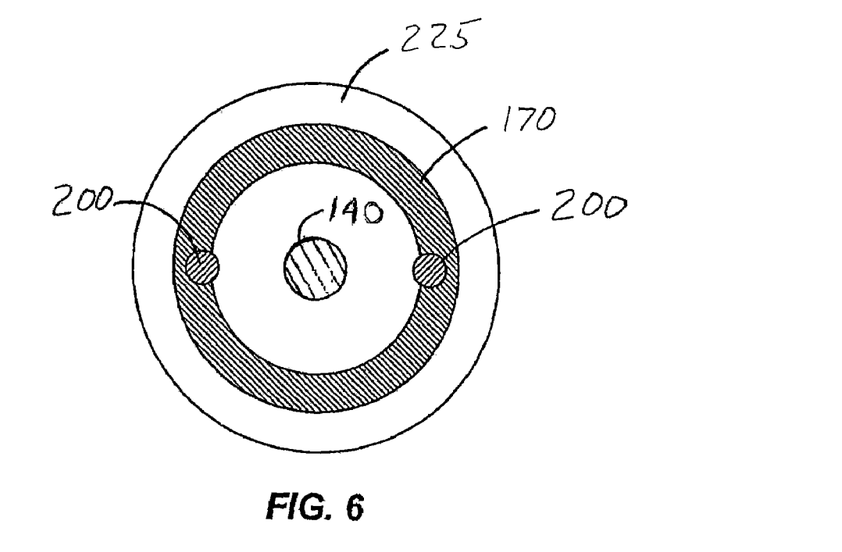
FIG. 6 is a cross-sectional view of the rotor of FIG. 5.

In motors with a relatively high number of poles, the inner diameter of the spacer 170, 170*a* is substantially larger than the shaft outer diameter. This is advantageous in reducing rotor weight and cost. The spacer 170, 170*a* may be fastened to the rotor core modules 135 using bolts or pins 200 such as those shown in FIG. 6. The bolts 200 are at least in partial contact with the spacer 170, 170*a* in order to improve mechanical rigidity of the rotor assembly 160.

In a preferred construction, the magnetic spacer 170, 170*a* is made by mechanically pressing or compacting and sintering powder of magnetic iron or soft magnetic composites. Materials with isotropic magnetic characteristics are preferable in order to enhance both the axial and radial magnetic flux path. To reduce manufacturing cost, the bolts or pins 200 can be formed as part of the magnetic extender 170, 170*a*. In some constructions, the magnetic extenders 170, 170*a* can be attached to a rotor core comprising laminations 95*a* by press fitting the projections 190 through lamination apertures 125.

Returning to FIGS. 5 and 7, a rotor 205 (shown in FIG. 5) includes two rotor core modules 135 that are separated by the spacer 170, 170*a*. Thus, the rotor 205 defines a rotor core length 210 that is equal to the axial length of the two rotor core modules 135 plus the axial width of the spacer 170, 170*a*. In the illustrated construction, the spacer 170, 170*a* is positioned between two substantially equal length rotor core modules 135. Of course, one of ordinary skill will realize that the spacer 170, 170*a* could be positioned between non-equal length rotor core modules 135 and that more core modules and spacers could be employed if desired.

A motor 215, illustrated in FIG. 7 includes the rotor 205 of FIG. 5. As can be seen, the rotor 205 includes a rotor core 220 as well as a permanent magnet 225 attached to the rotor core 220. The total axial length of the rotor core plus the magnetic extender 170, 170*a* is about equal to the axial length 210 of the magnet 225, which is greater than an axial length 230 of a stator core 235.

Figure 8:
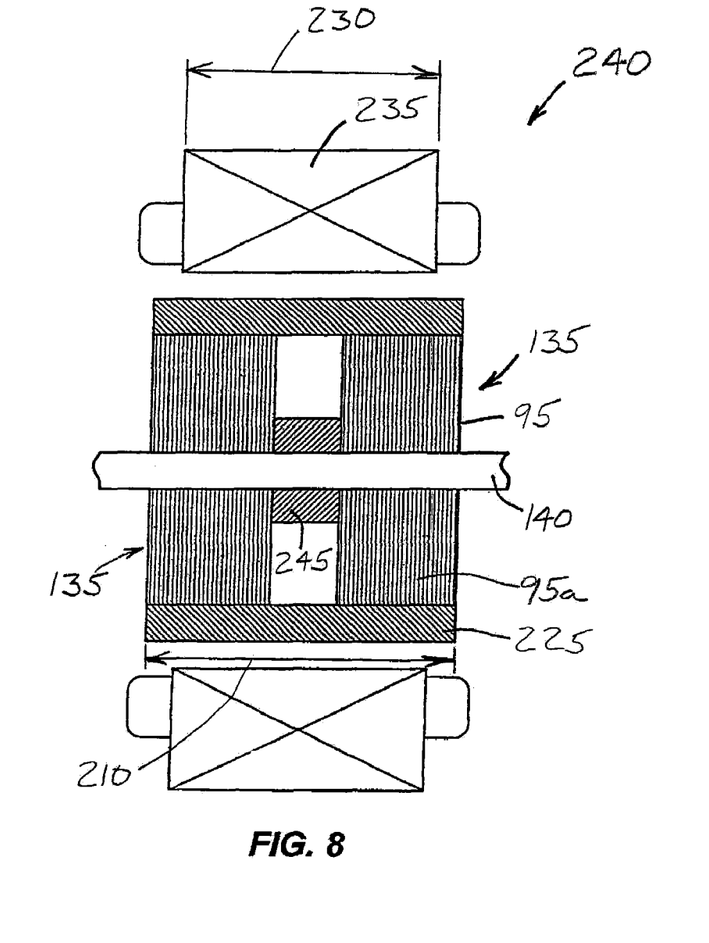
FIG. 8 is a schematic illustration of a longitudinal-sectional view of a motor including a stator and a rotor that includes a non-magnetic spacer.

FIG. 8 illustrates another motor construction 240 similar to the one illustrated in FIG. 7. However, rather than positioning the magnetic spacer 170, 170*a* near the outside diameter of the rotor core modules 135 as illustrated in FIG. 7, a non-magnetic spacer 245 is positioned between the rotor core modules 135 adjacent the rotor shaft 140. This construction has an advantage in reducing the forces generated during operation as it positions the weight of the spacer 245 nearer to the center of rotation. In addition, light weight and/or inexpensive material (e.g., plastic) can be employed to form the spacer 245.

Figure 9:
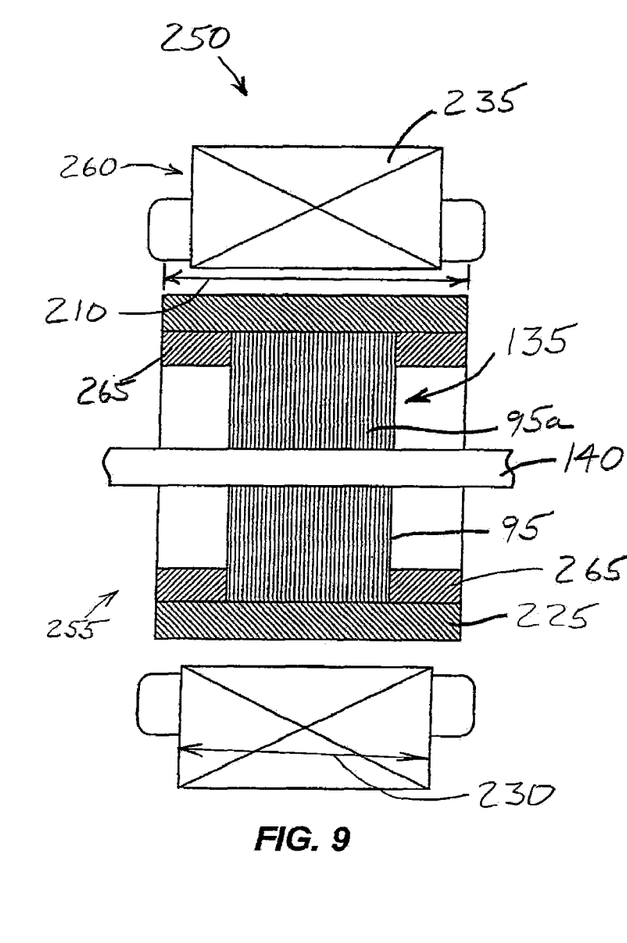
FIG. 9 is a schematic illustration of a longitudinal-sectional view of another motor that includes a stator and a rotor having end core extensions.

FIG. 9 illustrates another motor 250 that includes a rotor core 255 that is longer than a stator core 260. The construction of FIG. 9 includes one laminated rotor core module 135 and two magnetic extenders 265. Each of the two end-magnetic extenders 265 engages the laminated rotor core module 135 and extends away from the rotor core module 135. The two magnetic extenders 265 have the same size and shape and attach through bolts or pins, or are adhesively bonded to the end laminations of the laminated core module 135. The end-magnetic extenders 265 are preferably made out of a material, such as compacted powder of magnetic iron or soft magnetic composites, which enhance both the radial and axial flux path and concentrate the magnet flux through the stator core 260. In one construction, the magnetic extenders 265 look much like the spacers 170, 170*a* of FIG. 10 but omit the projections 190 on one side.

The constructions previously described employ stator and rotor laminations manufactured from the same electric steel. It is understood that other constructions in which the rotor laminations are produced from material of different thickness and/or grade than the stator laminations, although not preferable, are also possible. In this case, the number of laminations in the rotor may be different than the number of stator laminations, while the total length of the stack of laminations could be the same for the rotor and the stator.

Thus, the invention provides, among other things, an electrical machine with enhanced performance due to the additional length of the rotor core as compared to the stator core. Various features and advantages of the invention are set forth in the following claims.

What is claimed is:

1. An electric machine comprising:
a stator core having a stator core length;
a first rotor core portion;
a second rotor core portion;
a spacer coupled to the first core portion and the second core portion to at least partially define a rotor core having a rotor core length that is greater than the stator core length; and
a permanent magnet coupled to the rotor core and having a magnet length, the magnet length being greater than the stator core length,
wherein the first core portion and the second core portion together include a first quantity of laminations, and wherein the stator includes a second quantity of laminations that is about equal to the first quantity of laminations.

2. The electric machine of claim 1, wherein the rotor core length is substantially equal to the magnet length.

3. The electric machine of claim 1, wherein the first core portion and the second core portion include laminations.

4. The electric machine of claim 1, wherein the first core portion is spaced a non-zero distance from the second core portion to define a gap therebetween.

5. The electric machine of claim 4, wherein the first core portion defines an outer surface, and wherein the spacer is positioned within the gap such that it is adjacent the outer surface.

6. The electric machine of claim 4, further comprising a rotor shaft having a shaft outer surface, and wherein the first core portion and the second core portion are coupled to the shaft and the spacer is positioned within the gap such that it is adjacent the shaft outer surface.

7. The electric machine of claim 6, wherein the spacer includes a ferromagnetic isotropic material and protrusions that engage the first core portion and the second core portion.

8. The electric machine of claim 1, wherein the spacer is formed from a magnetic material.

9. The electric machine of claim 1, wherein the first core portion is in direct contact with the second core portion to define a first core end and a second core end, and wherein the spacer is disposed adjacent the first core end.

10. The electric machine of claim 9, further comprising a second spacer positioned adjacent the second core end.

11. The electric machine of claim 1, further comprising a third core portion and a second spacer, the spacer positioned between the first core portion and the second core portion, and the second spacer disposed between the second core portion and the third core portion.

12. The electric machine of claim 11, wherein at least one radially magnetized magnet is attached to the outer surface of at least one of the first core portion, the second core portion, and the third core portion.

13. The electric machine of claim 11, further comprising a shaft coupled to at least one of the rotor core portions, and a non-magnetic spacer positioned adjacent the shaft between the first core portion and the second core portion.

14. The electric machine of claim 11, wherein at least one of the first core portion, the second core portion, and the third core portion includes laminations, and wherein at least a portion of those laminations include weight-reducing apertures.

15. The electric machine of claim 14, wherein each of the first core portion, the second core portion, and the third core portion includes laminations having weight-reducing apertures that define a rotor core, and wherein the end most lamination on each end of the rotor core include laminations that do not include weight-reducing apertures.

16. An electric machine comprising:
a rotor shaft;
a quantity of stator laminations stacked adjacent one another to define a stator core having a stator core length;
a quantity of rotor laminations coupled to the rotor shaft, the quantity of rotor laminations being about equal to the quantity of stator laminations; and
a permanent magnet coupled to at least one of the rotor laminations and having a magnet length that is greater than the stator core length.

17. The electric machine of claim 16, further comprising a spacer coupled to the shaft and cooperating with the quantity of rotor laminations to define a rotor core having a rotor core length.

18. The electric machine of claim 17, wherein the rotor core length is greater than the stator core length.

19. The electric machine of claim 18, wherein the rotor core length is substantially equal to the magnet length.

20. The electric machine of claim 17, wherein the quantity of rotor laminations are divided into a first core portion and the second core portion that are spaced apart from one another to define a gap, and wherein the spacer is positioned within the gap.

21. The electric machine of claim 17, wherein the quantity of rotor laminations defines a first core end and a second core end, and wherein the spacer is disposed adjacent the first core end.

22. The electric machine of claim 21, further comprising a second spacer positioned adjacent the second core end.

23. The electric machine of claim 16, wherein the quantity of rotor laminations are divided into a first core portion and the second core portion that are spaced apart from one another to define a gap.

24. The electric machine of claim 16, wherein the spacer is formed from a ferromagnetic material.

25. The electric machine of claim 16, further comprising a first spacer and a second spacer, wherein the quantity of rotor laminations is divided into a first portion, a second portion, and a third portion, and wherein the first spacer is disposed between the first portion and the second portion and the second spacer is positioned between the second portion and the third portion.

26. The electric machine of claim 16, wherein at least a portion of the rotor laminations include weight-reducing apertures.

27. The electric machine of claim 26, wherein the quantity of rotor laminations at least partially define a rotor core, and wherein the end most lamination on each end of the rotor core include laminations that do not include weight-reducing apertures.

* * * * *

UNITED STATES PATENT AND TRADEMARK OFFICE
CERTIFICATE OF CORRECTION

PATENT NO. : 7,638,913 B2  Page 1 of 1
APPLICATION NO. : 11/420256
DATED : December 29, 2009
INVENTOR(S) : Ionel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this

Ninth Day of November, 2010

David J. Kappos
*Director of the United States Patent and Trademark Office*